United States Patent [19]

Stetson

[11] 4,092,694

[45] May 30, 1978

[54] OVERVOLTAGE SURGE ARRESTER HAVING LATERALLY BIASED INTERNAL COMPONENTS

[75] Inventor: Earl W. Stetson, Pittsfield, Mass.

[73] Assignee: General Electric Company

[21] Appl. No.: 778,006

[22] Filed: Mar. 16, 1977

[51] Int. Cl.2 .................... H02H 9/06

[52] U.S. Cl. .................... 361/126; 313/269; 315/36; 361/127

[58] Field of Search .................... 361/126–130; 313/258, 259, 269; 315/36

[56] References Cited

U.S. PATENT DOCUMENTS

| | | | |
|---|---|---|---|
| 2,050,334 | 8/1936 | Kellogg | 313/269 X |
| 2,861,782 | 11/1958 | Swartz | 313/269 X |
| 3,214,634 | 10/1965 | Osmundsen et al. | 315/36 |
| 3,226,593 | 12/1965 | Pittman | 313/269 X |
| 3,566,183 | 2/1971 | Olsen et al. | 315/36 |
| 3,987,343 | 10/1976 | Cunningham et al. | 315/36 X |

*Primary Examiner*—Harry E. Moose, Jr.
*Attorney, Agent, or Firm*—Francis X. Doyle; Richard A. Menelly

[57] ABSTRACT

Flat internal components of an arrester are stacked longitudinally inside the insulating housing cylinder with a perimeter portion contacting the inside wall of the housing. Each component has a guide channel extending longitudinally on its perimeter portion opposite the portion in contact with the wall. A resilient rolling bias member is disposed in the channel of each component in a deformed stressed state and forces the components laterally against the wall.

7 Claims, 8 Drawing Figures

OVERVOLTAGE SURGE ARRESTER HAVING LATERALLY BIASED INTERNAL COMPONENTS

BACKGROUND OF THE INVENTION

The present invention relates generally to overvoltage surge arresters which have a plurality of internal component units stacked inside a housing between conductive terminal members and relates more particularly but not exclusively, to such arresters which have as some of those units zinc oxide compound varistors surrounded by a thermally conductive electrically insulating resilient carrier for improving the thermal conductivity between the varistors and the housing.

Varistors of the zinc oxide compound type are sensitive to heating. With increasing temperature, their leakage current at a given voltage increases. This increased leakage current further raises the temperature, with the consequence that at a critical temperature and voltage condition the varistors become subject to a thermal runaway condition and fail by passing ever-increasing current. It is known that the thermal runaway condition can be minimized by improving the transfer of heat generated by leakage current in the varistor and by surge currents which may occur at times by improving the thermal coupling between the varistors and the housing porcelain. This can be done by surrounding each of the varistors with a thermally conductive electrically insulating material collar having a perimeter portion matching the inside wall contour of the housing and by making thermal contact between the collar and the housing wall. The insulating material may be, for example, a room temperature vulcanizing silicone rubber which is filled with an aluminum oxide sand containing coarse and fine grit.

The thermal contact between the collar and the wall may be made by stress fitting the collar in the housing. However, when the collar is highly filled with particulates to improve its own thermal conductivity, there is a dramatic decrease in its resilience. Without the needed resilience, it becomes necessary to require a low tolerance for mechanical dimension variations in the collar as well as in the housing in order to have a reliable stress fit. Such a tolerance requirement would signicantly increase manufacturing costs.

SUMMARY OF THE INVENTION

In accordance with the present invention, internal component units are provided with longitudinal bias surface. A round, insulating and resilient bias member is installed in a stressed condition against the guide surface of each unit and forces the unit toward the inside wall of the housing opposite the bias surface.

DESCRIPTION OF THE PREFERRED EMBODIMENTS

Example 1

Figure 1:
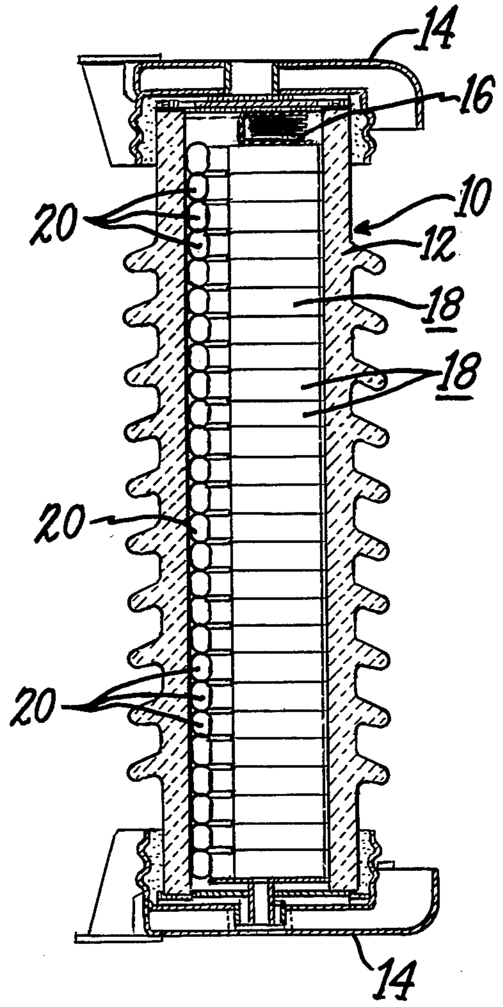
FIG. 1 is a partially exposed side view of an electrical overvoltage surge arrester in accordance with one embodiment of the present invention.

One preferred embodiment of the present invention is the arrester 10 shown in FIG. 1. The main body portion of the arrester 10 is a skirted cylindrical housing porcelain 12. At each end of the housing porcelain 12 is fastened a metal terminal end cap assembly 14, which is provided with means for releasing from the interior of the porcelain 12 any internally generated gas when the pressure exceeds a predetermined safety level. The upper end cap assembly 14 holds a contact plate 16 on a compression spring. A plurality of varistor units 18 are stacked longitudinally inside the arrester in compression between the lower terminal end cap assembly 14 and the sprung contact plate 16 of the upper cap assembly 14 and in mutual alignment. Each of the varistor units 18 is held in position by a resilient bias ball 20 installed in stressed condition between the unit 18 and the inside wall of the porcelain 12.

Figure 2:
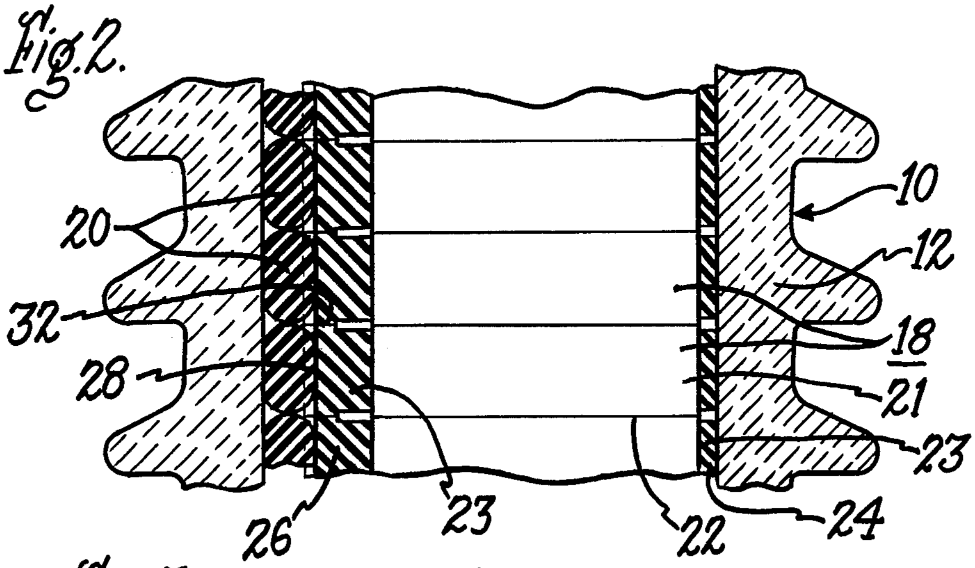
FIG. 2 is a more detailed side sectional view of a longitudinal fragment of the arrester of FIG. 1.
Figure 3:
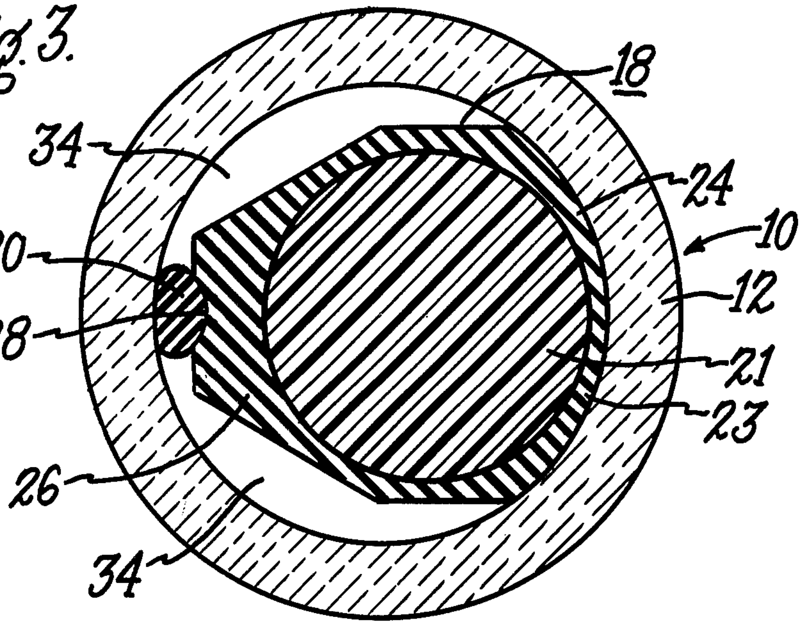
FIG. 3 is a lateral cross-section of the arrester portion of FIG. 2.
Figure 4:
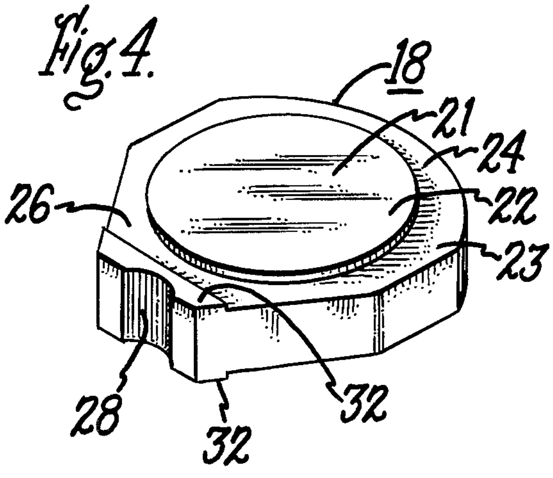
FIG. 4 is a plan view of one of the stack of internal components of the arrester of FIG. 1.
Figure 5:
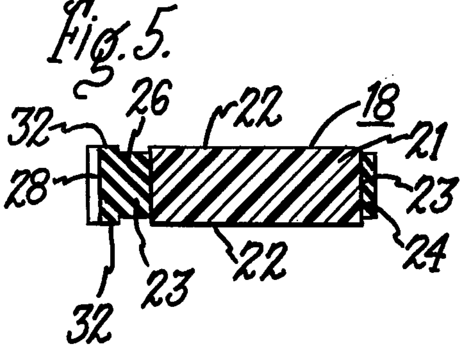
FIG. 5 is a side sectional view of the component of FIG. 4.

The FIGS. 2 and 3 show mutually perpendicular sections of a fragment of the arrester 10 in more detail, while the FIGS. 4 and 5 show in more detail an individual one of the varistor units 18. Referring now to FIGS. 2 and 3, the varistor units 18 include a discoidshaped varistor 21 of zinc oxide ceramic varistor compound. The two faces 22 of the varistor 21 are coated with metal to form contact electrodes. About the perimeter of the varistor 21 is a collar 23 of of electrically insulating and thermally conducting resilient material for heat transfer to the porcelain 12 and heat sinking for the varistor 21, as well as for physically carrying the varistor 21. A suitable material for the collar 23 may be made by mixing 1.8 parts by weight sand filler with 1 part low-viscosity two-component room-temperature-vulcanizing liquid silicone rubber binder, such as for example a product marketed in 1976 as RTV 627 by the Silicone Products Department of the General Electric Company, Waterford, New York, U.S.A. The sand is preferably a mixture of equal parts fine 180 grit and, coarse 80 grit aluminum oxide particulates, the grit being determined in accordance with U.S. Nat. Bureau of Standards specifications as described, for example in the U.S. Dept. of Commerce Publication 118-50, "Simplified Practice Recommendations". The primary function of the coarse sand is to improve the thermal conductivity, while the primary functions of the fine sand is to improve the structural properties of the material, to aid in suspending the coarse sand in the uncured rubber, and to displace the more costly silicone rubber binder.

Referring now additionally to FIGS. 4 and 5, the collar 23 includes a contact surface portion 24 which rests against the inside wall of the procelain 12 and includes also an opposite bias surface portion 26. The bias surface portion 26 has a longitudinal bias surface in the configuration of a guide channel 28. The bias surface portion 26 has slightly raised portions 32 on both sides of the unit 18 which are approximately the same longitudinal dimension as is the varistor 21, while the remainder of the collar 23 is a lesser longitudinal dimension than the varistor 21 in order to allow for the considerably greater coefficient of thermal expansion of the collar 23 as compared to the varistor 21.

Disposed between the guide channel 28 and the adjacent inside wall of the porcelain 12 in a stressed condition is the bias ball 20 of unfilled silicone rubber, which is highly resilient and electrically insulating. It may be the same rubber as that in the collar 23 as described above. The longitudinal dimension of the bias ball 20 in its stressed condition in the bias channel 28 is the same as, or slightly greater than, the longitudinally dimension of the varistor 21 and the guide channel 28, so that a plurality of balls 20 of a stack of the units 18 will remain in registry with the units 18.

It may be seen that each of the varistor units 18 is firmly held in place by its respective bias ball 20, with the contact portion 24 of the collar 23 of the unit 18 being firmly pressed laterally against the inside wall of the procelain 12 to fix it in place against lateral movement and also to establish a large area of thermal contact. The varistors 21 of the units 18 are thereby cushioned against breakage from mechanical shock of the arrester during transport or other handling.

The varistor units 18 in the stack may be assembled in the arrester 10 such that the bias balls 20 can be inserted one at a time from the top of the arrester 10 as each of the varistor units 18 are installed. This may be carried out by simply pushing the balls into the channel 28 with any convenient holding tool, or even by grasping them with the fingers. For example, each ball 20 may be impaled on a sharp pointed needle on the end of a dowel, forced down to its position, and the dowel and needle then removed by pulling upward. Moreover, the balls 20 and varistor units 18 can be readily removed again after assembly of the arrester 10 if it is found that one or more of the varistor units 18 are faulty and need replacement.

The raised portions 32 of the varistor collar 23 abut each other in the stack of the units 18 and thereby maintain a correct spacing which corresponds with that determined by the varistors 21.

The varistor units 18 have a non-circular shape in order to leave in the arrester 10 two venting spaces 34 to either side of the balls 20, as shown in FIG. 3, and extending longitudinally the entire length of the interior of the porcelain 12. The venting spaces 34 provide a free arcing space within the arrester 10 to provide volume for the gases which are generated in the event of failure, and also to provide a passageway for the gases that are generated to find their way readily to the venting end cap assemblies 14 so that the porcelain 12 is not fractured by the pressure.

Example 2

Figure 6:
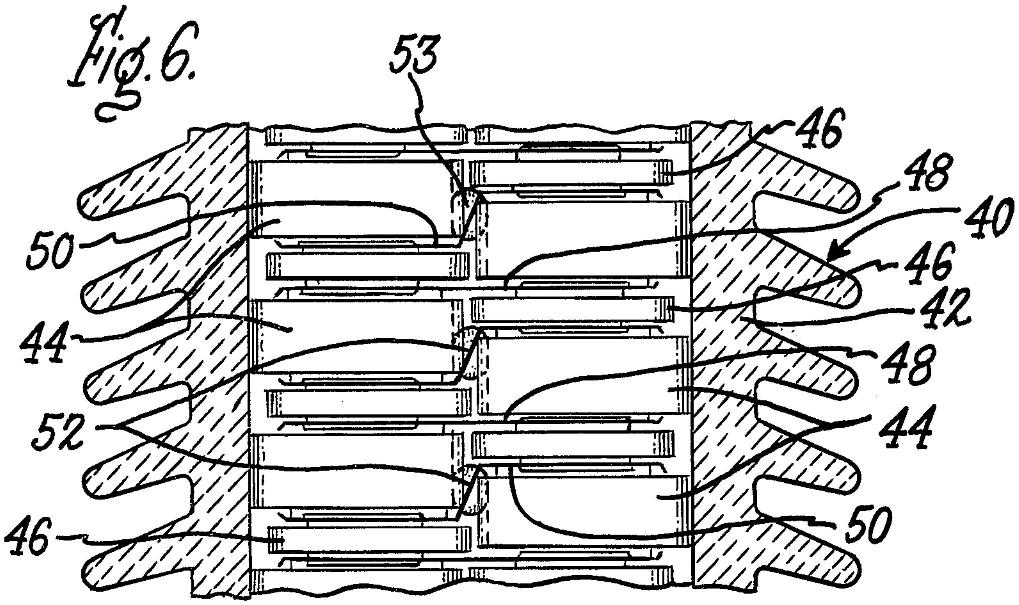
FIG. 6 is an exposed side view of a central fragment embodiment of the present invention.
Figure 7:
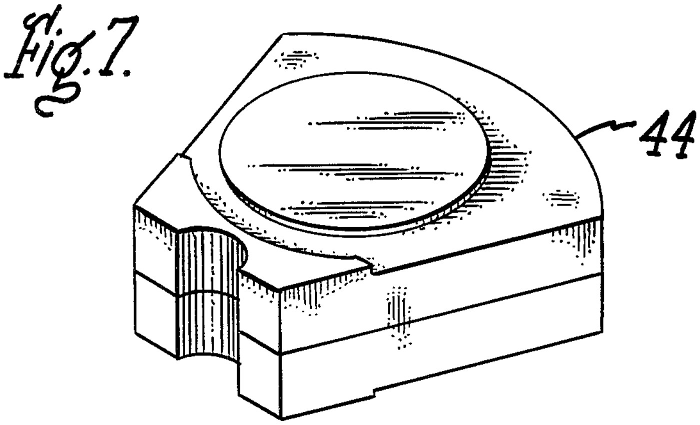
FIG. 7 is a plan view of one of the stack of internal component of the arrester of FIG. 6.
Figure 8:
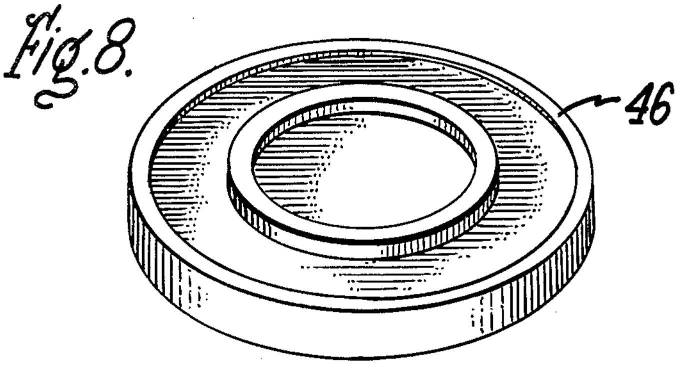
FIG. 8 is a plan view of another one of the stack internal component of the arrester of FIG. 6.

Another preferred embodiment of the present invention is the arrester 40 shown in the FIG. 6 of the drawings. The arrester 40 has a housing of the same general type as that of the arrester 10 of the first example above and includes a porcelain 42. Inside the porcelain 42 are two parallel and opposing stacks of varistor units 44, one of which is shown in greater detail in the FIG. 7. The units 44 of each stack are separated by electrically insulating ceramic plate spacers 46, one of which is shown in greater detail in the FIG. 8. While the units 44 are mechanically in parallel they are connected electrically in series by the provision of flat connection straps 48 and stepped connection straps 50 pressed in interconnecting contact with the faces of the units 44 by the adjacent insulating spacers 46.

The varistor units 44 are held in place resilient bias balls 52 which are located along the axis of the porcelain 42 in a stressed condition and between adjacent and opposing portions of the guide channels of semi-staggered units 44 of the two stacks. An arrangement of varistor units in mechanically parallel and electrically series stacks permits a shorter porcelain to be used for an arrester of a given voltage rating.

GENERAL CONSIDERATIONS

Various modifications in the configuration of the arrester housing and internal components can be made which are still completely within the spirit of the present invention.

The housing may have a variety of configurations which require only relatively minor modifications of the internal components to permit them to be fixed in place with the use of bias balls. For example, the housing porcelain may be a cylinder with a square cross section for the interior space. For such a porcelain, varistor units with round varistors could be provided with collars of a generally triangular shape, with one point of the triangle having a guide channel for the bias ball.

While in the examples of the preferred embodiments only the varistors were provided with collars having a guide channel, it should be understood that other internal components can themselves be made into a configuration which would permit them to be held in place by a bias ball in a fashion similar to the above-described varistor units 18, or could be provided with a collar having the desired configuration for holding it in place laterally with a bias member. This would include, for instance, components such as gap units.

A bias surface other than a guide channel can be used for insulating resilient bias members other than bias balls. For example, the bias member may be a short cylinder with the guide surface being a flat surface on the collars of the varistor units. Or, such short cylinder bias members may be provided with a smaller diameter central portion which rides over a guide means in the form of raised ribs on the bias surfaces of the collars. The ball configuration for the bias members is particularly useful in that it requires a minimum of material for the bias function, permits better visibility on installation of the varistor units, and further increases the total venting space of the arrester. In general, any body sufficiently resilient and also electrically insulating may be used as a bias member.

I claim:

1. An electrical overvoltage surge arrester, comprising:

a hollow insulating housing cylinder with conductive electrical terminal members;

a plurality of internal components disposed in said housing and closely stacked longitudinally therein with first contact surfaces of first perimeter portions resting against an inside wall of said housing;

second, bias surfaces on second perimeter portions of said components, said bias surfaces extending longitudinally in said housing and resilient electrically insulating bias members disposed in a deformed, stressed state against said bias surfaces and forcing said first surfaces against said wall.

2. The arrester of claim 1 wherein the longitudinal dimensions of said member as installed in said arrester is approximately equal to the longitudinal dimension of said bias surface.

3. The arrester of claim 2 wherein said bias member is spherical.

4. The arrester of claim 3 wherein said component is a varistor unit.

5. The arrester of claim 4 wherein said varistor unit comprises a varistor discoid provided with a collar of resilient electrically insulating material about its perimeter a first contact surface of a first perimeter portion of said collar resting against the inside wall of said housing and a second, bias surface opposite perimeter portion having a longitudinally extending channel with a radius of curvature approximately equal to the unstressed radius of said spheroid.

6. The arrester of claim 5 wherein said varistor is of a zinc oxide ceramic varistor compound, said collar material is a resilient binder filled with granular heat-conducting particles, and said housing is elongated and is generally circular in crosssection.

7. The arrester of claim 6 and wherein said components are stacked along substantially the entire length of said housing and resiliently clamped between terminal end cap assemblies fixed to the ends of said housing and wherein said bias member is between said bias surface and the inside wall of said hosing remote from said contact surfaces.

* * * * *